March 7, 1939. B. E. STRAUSS ET AL 2,150,110
CAR HEATER AND DEFROSTER
Filed Feb. 20, 1937

Inventors
Hubert Faultersack.
Bernhard E. Strauss
Attorneys

Patented Mar. 7, 1939

2,150,110

UNITED STATES PATENT OFFICE 2,150,110

CAR HEATER AND DEFROSTER

Bernhard E. Strauss, Watertown, and Hubert Faultersack, Waukesha, Wis.; said Strauss assignor to Alfeo Testolin, Waukesha, Wis.

Application February 20, 1937, Serial No. 126,856

2 Claims. (Cl. 20—40.5)

This invention pertains to an automobile heater and defroster, and has primarily for its object the provision of an apparatus of the foregoing type for defrosting the windows of the doors, as well as the windshield and body windows.

Incidental to the foregoing, a more specific object of the present invention resides in the provision of exceedingly simple, inexpensive, and efficient means for conducting heated air through the door panels, and directing the same against the window-glass.

Another object of the invention resides in utilizing the window moulding, both as a conductor and discharge nozzle for the heated air.

A further object resides in the novel manner of effecting a communication between the air passages, or ducts in the doors, and those in the stationary parts of the body.

A still further object resides in the provision of means for selectively cutting off a portion of the air passages to obtain more rapid defrosting of the windshield upon initial starting of the motor, thus eliminating undue delay in obtaining sufficient vision to permit safe driving.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing two forms of the present invention are illustrated constructed according to the best mode so far devised for the practical application of the principles thereof.

Figures 1, 2, 3, 4:
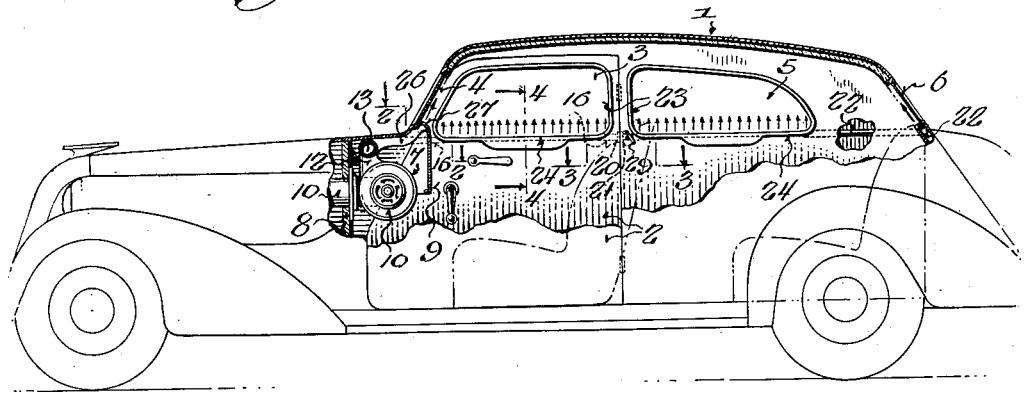
Figure 1 is an elevation of a conventional motor vehicle of the two-door sedan type, with the invention applied thereto, parts being broken away and in section to more clearly illustrate structural features.
Figure 2 is an enlarged detail section taken on the line 2—2 of Figure 1, illustrating the connection between the air ducts in the body and free edge of the door.
Figure 3 is a similar section taken on the line 3—3 of Figure 1, showing the connection between the ducts at the hinged edge of the door.
Figure 4 is a vertical fragmentary section, taken on the line 4—4 of Figure 1, through the door panel and window.

Referring now more particularly to the accompanying drawing, in which a standard type of two-door sedan is illustrated, the numeral 1 designates generally the body, which is provided with the usual hinged doors 2, equipped with sliding window-glasses 3, a windshield 4, and side and rear windows 5 and 6, respectively.

While there are a number of car heaters now on the market, which provide for defrosting the windshield, as far as is known, no attempts have been made to defrost the door windows, or the side and rear windows of the body, by means of heated air, and inasmuch as this is not only essential to safe-driving, but also highly desirable to the rear occupants of the car, the salient feature of the present invention resides in the novel structure of heater and defroster for accomplishing the foregoing.

While the present invention may be employed with any type of hot air circulating heater, for the purpose of explanation the same is illustrated in connection with a conventional manifold type of heater, comprising a blower 7 mounted upon the dash 8 below the instrument panel 9. A flue 10 extending through the dash forms a communication between the blower 7 and the manifold heater (not shown). An electric motor 11, mounted upon the side of the blower, serves to operate the same.

Connected with the blower discharge 12 is a transverse header 13, positioned below the cowl and terminating in the ducts 14 positioned within the forward side panels 15 of the body 1, as best shown in Figure 2. The door panels 2 are provided at their free forward edges with the ducts 16, adapted to aline with the ducts 14 when the doors are closed, thus providing a communication between the two, and in order to effect a tight abutting joint between the ducts, yieldable gaskets 17, preferably formed of rubber, are inserted into the edges of the panels 15, and abut the ends of the ducts 14.

Resilient wear plates 17' are secured to the edges of the panels 15, and extend over the faces of the gaskets 17 to be engaged by the ferrules 18 slidably carried by the free edges of the door panels 2, and projecting beyond their faces. Yieldable gaskets 19 are disposed between the ferrules 18 and the ends of the ducts 16 to normally project the ferrules for engagement with the wear plates 17'. Obviously, as the doors 2 are swung inwardly to closed position, as shown in Figure 2, the gaskets 17 and 19 will be compressed to form a tight seal between the duct joints, and also serve as anti-rattlers for the doors.

At the hinged edge of the doors, a similar joint is provided, should it be desired to carry the heated air through the rear portion of the body for defrosting the side and rear windows 5 and 6, in the manner illustrated. In this instance, the ferrules and wear plates are eliminated, inasmuch as there is no sliding action between the edge of the doors and the rear body panels. Therefore, the door ducts 16 are merely provided with abutting yieldable gaskets 20 positioned within recesses formed in the edge faces of the door panels, while the rear body panels are provided with similar gaskets 21 which abut the body ducts 22.

While the ducts 14, 16, and 22 may extend throughout the body and door panels, for the purpose of simplicity and cheapness of construction, the preferred form of the invention contemplates utilization of the window mouldings 23, both as conductors and discharge nozzles, for directing heated air against the windows. Therefore, in the installation illustrated, the ducts 16 and 22 are connected to the lower stretches 24 of the window mouldings 23, which are hollow, or closed, as best shown in Figure 4, and are provided with slots or perforations 25 directed against the door windows 3, and the side and rear body windows 5 and 6.

One or more ducts 26 may be connected with the blower header 13 for discharging air against the windshield 4, through suitable openings 27 provided in the instrument panel 9.

From the foregoing explanation, considered in connection with the accompanying drawing, it will be seen that an exceedingly simple, inexpensive, and efficient heater and defroster has been provided, that effectively maintains clear vision of the door and body windows, in addition to defrosting the windshield, and inasmuch as the various ducts are positioned within the door and body panels, the attractive appearance of the interior of the car is in no way marred.

It will also be appreciated that utilization of the window mouldings, both as heated air ducts and discharge nozzles, materially simplifies and reduces the cost of installation. Likewise, inasmuch as the heated air is discharged through the lower stretches of the mouldings, the defrosting action is most effective, in that the heated air has a tendency to rise and follow along the glass. Furthermore, in making provision for clearing the door and body windows, in addition to the windshield, more uniform and effective heating of the vehicle is obtained because of distribution of the heated air.

In addition to the foregoing, when the motor is initially started, it is highly desirable to obtain clear vision through the windshield, and possibly the forward windows with minimum delay, to allow safe driving. Therefore, the apparatus may be provided with means for cutting off a portion of the ducts to concentrate discharge of heated air upon the desired windows. One way in which this can be accomplished is illustrated in Figures 1 and 3, in which the rear body ducts 22 are provided with valves 28 actuated by thumb knobs 29 disposed upon the interior of the car. If these are not desired, it is merely necessary to insert a thin sheet of material between either of the door edges and the body before closing the door, which cuts off communication between the adjacent ducts until such time as the desired windows are cleared, after which the air may be circulated through the entire system.

We claim:

1. In an automobile of the closed type having a hinged door provided with a window, a hot air heater, a duct leading from the heater to and having an end communicating with the door opening at the front side and adjacent the top of the door opening, and a hollow horizontal molding connected to the door, itself alone forming the entire bottom of the window opening and constituting a complete finishing strip, said molding having a top, bottom and sides, the inner side being disposed adjacent to the pane of the window but to allow the window pane to slide past the molding and said inner side of the molding having hot air outlets disposed to direct the heated air against the window pane, the molding further having a front end disposed to communicate with said end of the duct in closed position of the door, and having its ends extending beyond the ends of the window opening and terminating adjacent the respective ends of the door.

2. An automobile in accordance with claim 1, wherein there is provided a second window rearwardly of the door, the bottom of the opening of the second window being defined by a similar hollow thorizontal molding having hot air outlets disposed to direct the heated air against the pane of the second window, and having a front end disposed to communicate with the rear end of the first named hollow molding.

HUBERT FAULTERSACK.
BERNHARD E. STRAUSS.